United States Patent [19]

Ramanan et al.

[11] Patent Number: 5,115,428
[45] Date of Patent: May 19, 1992

[54] SERIAL ARRAY TIME-SLOT INTERCHANGERS

[75] Inventors: Srinivasan V. Ramanan, Boulder; Harry F. Jordan, Ward, both of Colo.

[73] Assignee: The University of Colorado Foundation, Inc., Boulder, Colo.

[21] Appl. No.: 402,948

[22] Filed: Sep. 5, 1989

[51] Int. Cl.$^5$ ............................................. H04Q 11/04
[52] U.S. Cl. ........................................ 370/68; 359/140
[58] Field of Search ...................... 370/4, 66, 68, 58.1, 370/58.2, 58.3, 67, 59, 63, 64

[56] References Cited

U.S. PATENT DOCUMENTS

| | | | |
|---|---|---|---|
| 3,956,593 | 5/1976 | Collins et al. | 370/63 |
| 4,686,670 | 8/1987 | Kessels et al. | 370/68 |
| 4,759,010 | 6/1988 | Murata et al. | 370/58.2 |
| 4,922,479 | 1/1990 | Su | 370/1 |

OTHER PUBLICATIONS

Thompson et al, "An Experimental Photonic Time Slot Interchanger Using Optical Fibers as Reentrant Delay Line Memories", IEEE, 1987.

Thompson, "Architectures with Improved Signal-to-Noise Ratio in Photonic Systems with Fiber-Loop Delay Lines", IEEE 1988.

Primary Examiner—Duglas W. Olms
Assistant Examiner—Wellington Chin
Attorney, Agent, or Firm—Earl C. Hancock

[57] ABSTRACT

A series array architecture using multiple photonic stages perform universal permutation of time-slots on a time-multiplexed photonic signal using far fewer switches than the currently known architectures. The array architectures include Serial switch arrays with feed-forward delay, Serial switch arrays with feedback delay using shift-base of 2, and Serial switch arrays with feedback delay using shift-base of 3. The array has multiple stages where each can be described as the temporal equivalent of spatial interconnection networks.

19 Claims, 6 Drawing Sheets

- K(∂): BASIC BLOCK WITH LOOP DELAY ∂
- A, B, D, E: PHOTONIC TERMINALS
- A and B: INPUT TO THE SWITCH
- D and E: OUTPUT OF THE SWITCH
- ▨4▨: HATCHED TIME-SLOTS APPEAR IN THE FINAL OUTPUT
- C: ELECTRONIC CONTROL TERMINAL
- X: CROSSED STATE
- =: BAR STATE
- *: EMPTY TIME-SLOT OR ONE THAT BELONGS TO A NEIGHBORING FRAME

| Slot number | Absolute shift | Time-slot traversal in each loop | | | |
|---|---|---|---|---|---|
| | | 3* | 2 | 1 | *Tap |
| 0 | 3 | 1 | 0 | 0 | |
| 1 | 4 | 1 | 0 | 1 | |
| 2 | 5 | 1 | 1 | 0 | |
| 3 | 6 | 1 | 1 | 1 | |
| 4 | 0 | 0 | 0 | 0 | |
| 5 | 1 | 0 | 0 | 1 | |
| 6 | 2 | 0 | 1 | 0 | |
| 7 | 3 | 0 | 1 | 1 | |

FIG. 8A.

| Slot number | Absolute shift | Required No. of loop traversals within each switch | |
|---|---|---|---|
| | | 2 | 1 |
| 0 | 3 | 1 | 1 |
| 1 | 4 | 1 | 2 |
| 2 | 5 | 2 | 1 |
| 3 | 6 | 2 | 2 |
| 4 | 0 | 0 | 0 |
| 5 | 1 | 0 | 1 |
| 6 | 2 | 1 | 0 |
| 7 | 3 | 1 | 1 |

FIG. 10.

Time-slots entering K(1)

FIG. 11A.

$S_0$ comes out without any delay

FIG. 11B.

$S_1$ enters the loop for a unit delay

FIG. 11C.

Effects of attempting to
delay $S_0$ by 0 slot duration
delay $S_1$ by 1 slot durations
delay $S_2$ by 2 slot durations
delay $S_3$ by 3 slot durations
and so on by using a single
block K(1)

FIG. 11F.

$S_1$ comes out and $S_2$ enters the loop

FIG. 11D.

$S_2$ reenters the loop but forces $S_3$ to exist without any delay

FIG. 11E.

SUMMARY OF SWITCH BEHAVIOR

| To shift $S_0$ by the no. of durations given below: | The shifts for the following slots will be restricted as follows: | | | |
|---|---|---|---|---|
| | $S_1$ | $S_2$ | $S_3$ | $S_4$ |
| 0 | ———— | NO | RESTRICTION | ———— |
| 1 | $\geq 1$ | NO | RESTRICTION | ———— |
| 2 | 0 | $\geq 1$ | NO | RESTRICTION |
| 3 | 0 | 0 | $\geq 1$ | NO RES. |
| 4 | 0 | 0 | 0 | $\geq 1$ |

SERIAL ARRAY TIME-SLOT INTERCHANGERS

BACKGROUND OF THE INVENTION

1. Field of the Invention

The present invention relates to methods and apparatus for rearranging the sequential time relation between a plurality of discrete data segments occurring within a predetermined period of time. More particularly, the present invention relates to apparatus and methods for receiving a series of blocks of data which occur during a predetermined time frame with those data blocks interchanged or otherwise rearranged in their order of appearance as an output within a time frame of equal length to the input time frame. Although it has utility in purely electronic applications, the present invention is especially useful in optoelectronic and/or photonic environments requiring the handling, processing and/or communicating of photonic data.

Note that while this specification and description contains extensive emphasis on implementation by means of optic and optoelectronic elements and components, the invention is not so limited. Those having normal skill in the art will recognize technologies or combinations of disciplines are available to utilize the invention including all electronic implementations.

2. Description of the Prior Art

Time-slot interchangers accept a serial input signal typically consisting of several equal length blocks of data which are time multiplexed into a larger block of serial data. The time period occupied by the large block is called a frame, while the smaller blocks occupy time-slots within the frame. Multiple frames may follow each other in succession. Corresponding time-slots of successive frames are thought of as belonging to one particular body of data. For example, in the communications environment, a given time-slot in successive frames may contain the digitized version of a particular telephone voice transmission. The output of a time-slot interchanger is a serial signal of the same format as the input, but the data blocks occupying the time-slots are permuted so that a different time-slot within the frame is occupied by the output data. Except for ordering of time-slots, the data is unchanged. Using the communications example, if output time-slots correspond to receivers of compressed voice transmissions, a time-slot interchange represents a mapping, or interconnection, between transmitters and receivers.

A time-slot interchanger is thus the time domain equivalent of a multiple input, multiple output switching network. If there are N time-slots per frame and the interchanger is capable of an arbitrary permutation, there exists the time domain equivalent of an N input, N output crossbar switch. Such a switch is useful wherever independent data items are time multiplexed on a single channel. This could apply within a digital computing system, as well as in a communications network. A time multiplexed channel might connect several subunits of type A to subunits of type B, with a fixed order assigned to the subunits for sending data to, and receiving data from, the channel. An arbitrary permutation performed by a time slot interchanger in the channel would correspond to a random interconnection of type A subunits to type B subunits.

For time-slot interchangers implemented and used with photonic signals, the optical information is carried serially in optical fiber. The basic elements of which the interchangers are built includes fiber delay lines, fiber splitters, and controlled directional couplers. The interchanger system designer should note that controlled directional couplers are expensive, in size, power and cost, compared to the other elements.

For purposes of this description, a serial photonic signal carried by a fiber and organized as a sequence of frames is considered as the input signal. In data communications, various channels may share the same transmission medium by time-division multiplexing, where the different time-slots within each frame are allocated to different channels. In an optical computer, several processes can run simultaneously, and a fiber link between the processors and the memory may carry a time multiplexed data stream, where each time slot within a frame may consist of a word from each of the processors. In either of the above areas, at one or more points between the source and the destination, processing may require an interchange of the time-slots within the frames.

For instance, in a communication network, between every pair of communicating stations, a number of switching nodes may exist which require time-division switching between incoming and outgoing traffic. To obtain massive processing power, an optical computer should not only tap the spatial parallelism but also harness the time domain, thus obtaining the advantages of extremely high speeds and short pulses. Exploiting the time domain would in turn mean that in an optical computer, time-slot interchange may represent a basic functional requirement.

Interchange of digital data from time-slots in the input to time-slots in the output is possible in both a bit-interleaved data format as well as in a word-interleaved data format. In the description contained herein, the word-interleaved data format is assumed throughout although the invention is equally applicable to bit interleave formation. The word-interleaved format seems naturally suited to a switching system whose building block, for example, is a commercially available Ti:LiNbO3 directional coupler. This device is basically electronically controlled, though its switched data is photonic. With word-interleaved data format, a much higher data rate may result than that permitted directly by the electronic switching time of the directional coupler. This is possible because switching needs to take place only between the boundaries of time-slots with the switching time accommodated by providing guard bands of time between neighboring time-slots.

In general, it is assumed there are N time-slots per frame and B bits per time-slot with a data rate of F frames per second. The time-slots are named $0, 1, 2, \ldots, N-1$, while the frames are called $F_0, F_1, \ldots$, etc.. For simplicity, the guard band, start bit, etc., are integrated into each time-slot and the frame is shown to consist only of N time-slots. The frame advances so that, as $F_k$ arrives at an input tap, the input receives the data $0, 1, 2, \ldots, N-1$ in that sequential order. Hence the data rate is F frames/s, or FN time-slots/s and the time-slot switching rate is Fn Hz. If c is the velocity of light in vacuum and r is the refractive index of the fiber, then the length L of fiber occupied by a time slot is:

$$L = c/FNr.$$

A time-slot interchanger using a number of switches directly proportional to the number of time-slots, N, is presented by R. A. Thompson in "Architectures With Improved Signal-To-Noise Ratio In Photonic Systems With Fiber-Loop Delay Lines", *IEEE Journal On Selected Areas In Communications,* Vol. 6, No. 7, Aug. 1988. This system receives a data stream which is demultiplexed so as to route segments thereof to various parallel delay lines. Each delay line typically has a different delay magnitude as compared to its neighbors. The outputs of the array of parallel delay circuits are combined through a multiplexer to generate a serial output stream with a rearranged order of time slots relative to the input stream. While functionally acceptable as a time-slot interchanger, such systems are expensive to fabricate and require large bulks of delay lines.

Alternate architectures using much shorter delay lines for time slot interchanging is also known wherein the parallel delay circuits each are configured with a single switch with feedback loop delay or cascade of 2×2 switches which are interconnected through a delay. Such variable integer delay systems using demultiplexer, multiplexer and cascade coupled photonic switches are described in the article entitled "An Experimental Photonic Time-Slot Interchange Using Optical Fibers As Reentrant Delay-Line Memories" by Thompson and Giordano, *Journal of Lightwave Technology,* Vol. Lt-3, No. 1, Jan. 1987, pages 154–161. These systems require even more switches proportional to the number of time-slots/frame and require signal passage through a large number of switch elements.

DISCLOSURE OF THE INVENTION

The present invention is apparatus and methods for interchanging data containing time slots wherein N of such time slots occur during a predetermined frame of time. A plurality of switching elements are used each having an input and an output. These switch elements each respond to a first control signal introduced thereto for coupling their inputs directly to their outputs while responding to a second control signal introduced thereto for producing signals from the input at the output means after a predetermined time delay has passed.

The switching elements inputs and outputs are coupled in a serial array with the first switching element of that serial array having the frame containing N time slots coupled to the input thereof. Sequences of control signals are then produced for causing the serial array to produce a frame of N time slots at the output of the last switching element thereof with time slots occupying time sequence relationships therebetween different from the time sequence introduced to the input of the first array switch element.

The switching elements can each include a feedback of its output signals thereof to its input after a predetermined time delay. This feedback preferably can produce feedback signals after a time delay of a duration which is a multiple of a slot duration.

As mentioned, it is possible to implement the invention using switching elements which are photonic switches along with a feedback that is an optical delay line coupled from the switch output to its input. The delay line can delay the feed back signal by a multiple of a time slot duration. The switching elements can also be 2×2 photonic switches.

Apparatus pursuant to this invention can provide interchanging of data which is contained in a multiplicity of serially occurring time slots with N such time slots contained in a predetermined frame of time. It employs a plurality of switch elements each having first and second input terminals and first and second output terminals.

The switch elements each normally couple the input terminals to respective output terminals (i.e.: the first input terminal to the first output terminal and the second input to the second output).

The switch elements further can include means responsive to control signals introduced thereto for causing the switch to reverse its input terminal to output terminal connections (i.e.: first input to second output, etc.). The signals at one of the output terminals are reproduced after a time delay. This plurality of switch elements are interconnected in a serial array with one of the input terminals of the initial switch element coupled as an array input for receiving the original frame of N data time slots. The other switch elements have respective input terminals coupled to output terminals of the preceding switch for receiving undelayed signals at one input terminal and signals delayed by a time delay of the preceding switch at the other input terminal. Control signals are generated and connected for selectively providing control signal inputs to respective switch elements for delaying at least one of the time slots so that it occurs in a different sequential position in the frame of N time slots produced at one of the output terminals of the last switch element of the serial array.

The aforementioned time delay is obtainable via a delay line coupled between one of the switch element output terminals of the switch element for requiring a signal delay and an input terminal of the next downstream switch element. The output of the last array switch element delay line can thus provide the output for the serial array. Again, photonic directional couplers can function as the switch elements, and optical delay loops are suitable for the delay lines.

In another configuration, the time delay is implementatble as a delay line coupled between one of the switch element output terminals and one of its input terminals. This permits reintroduction of data time slots coupled to one of the output terminals to the switch element at the aforementioned input terminal in delayed time relation. Preferably the delay line responds to an input thereto to produce an output therefrom after a time delay which is a whole number multiple of a slot duration.

The present invention is also applicable as a process for interchanging a plurality of data containing time slots with N time slots occurring in a first sequence during a predetermined frame of time. The process advantageously utilizes a plurality of serially arranged switch elements each of which responds to a control signal to transfer signals at an input thereto to an output thereof either directly or after a predetermined delay in response to the state of that control signal.

The process includes the steps of receiving the first sequence of N time slots and passing the original N time slot signals seriatem through a plurality of the aforementioned switch elements. Control signals are introduced to the switch elements for delaying selected time slots so that they appear at the output of the last switch element in a second sequence different from the original frame sequence.

It is possible to arrange the switch element so they are capable of responding to control signals so as to concurrently delay a prior received signal and pass a subsequent received time signal directly to the output thereof. Generation of at least one sequence of control signals for controlling a switch element can cause that switch to produce a time slot at a later occurring position in the frame of N time slots from the output of the serially arranged switch elements. Accordingly, the real time occurrence of the frame of N time slots at the serial array output is delayed by at least one time slot duration relative to the real time occurrence of the frame of N time slots at the input to the serial array of switch elements.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENT

Figure 1A:
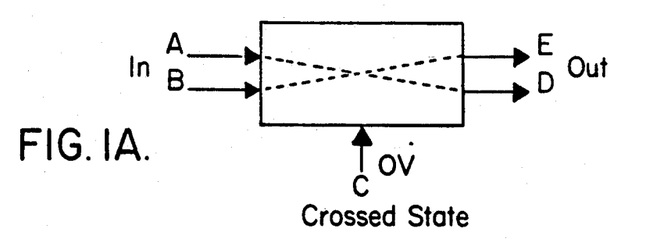
FIGS. 1A and 1B are a directional coupler element shown in its two transmission states.
Figure 1B:
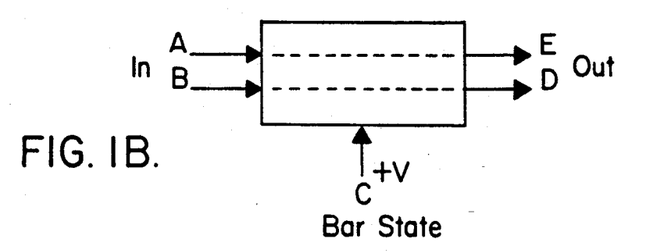

FIG. 1 illustrates a contemporary photonic directional coupler. It is a two-input, two-output (2×2) device where the input signals either propagate directly through in the "bar" state (represented as =) or crossover in the "crossed" state (represented as x). The magnitude of the external control voltage determines the transmission state. As shown in FIG. 1A, the directional coupler is in the crossed state with nominal zero voltage applied to terminal C, while FIG. 1B shows an application of positive voltage to C so as to switch the device to the bar state.

It is the photonic version of a 2×2 "beta element" or "Kautz cell" where the switched data is photonic and the control signal is electronic. This device is referred to simply as the "switch" in subsequent discussions.

There are two fundamental ways of using the FIG. 1 switch in an optical circuit. One way is to consider this as a five terminal optical device. This is done by generating the control voltage for C by converting the optical signal by a photodiode amplifier combination. The switch then behaves as a logic element.

It is also possible to retain pure electronic control over switched data which is photonic. There is no direct signal path between the electronic terminal C and any of the other photonic terminals. This mode of usage of the directional coupler is particularly well adapted to this invention since the concern is not with what the actual data is, but rather is in bundles of data, namely time-slots and switching them at the boundaries between them. When a word-interleaved scheme is used, the bit rate is much higher than the electronic switching rate.

A photonic time-slot interchanger functions in a synchronous mode with a control clock ticking every time-slot duration and controlling all the switches in the system.

In a time-division multiplexed system, the movement of time-slots within each frame is predetermined at the system level and hence from this point of view, a time-slot interchanger performing a fixed permutation is a circuit switched system.

An interconnection network can either have a static or dynamic topology depending on whether the interconnections are non-reconfigurable or reconfigurable, respectively. A photonic time-slot interchanger provides for path reconfiguration and hence is considered having a dynamic network topology.

Generally, in a time-slot interchanging system, an important requirement is that its output maintain frame integrity. Frame integrity refers to keeping all the N time-slots belonging to each frame intact within N consecutive slot intervals and not letting any of them spill over to the neighboring frames. This invention provides for frame integrity.

The phase relationship between an input and output frame is a function of the system delay associated with the interchangers and the permutation performed with a frame. That is, if a time-slot interchanger is introduced between the input and output, it would force an output frame delay whose value depends on the permutation performed on the slots. Some applications may require that the phase delay between the input frame and its corresponding output frame remain fixed, typically at the duration of one frame which can easily be achieved by introducing additional delay.

It is useful to define "shift" as a parameter for measurement in evaluating a time-slot interchange problem for a time-division multiplexed signal. This would lead us to other related definitions as given below. Output frame integrity is assumed throughout. Shift is chosen as a general parameter for measurement and is measured in terms of number of time-slot durations. It is an integer and can measure the phase difference between frames, the movement of time-slots, or is useful in the analysis and design of a system handling time-division multiplexed signals.

Relative shift is defined as the integral number of time-slot durations by which a certain time-slot in the input frame is to be shifted with respect to the leading edge of the frame, so that it goes to its new location in the output frame. Relative shift is a positive number if the time-slot concerned is to be shifted away from the leading edge, zero if there is no change in its relative position and negative if it is shifted towards the leading edge.

Absolute shift is defined as the integral number of time-slot durations by which a certain time-slot in the input frame is to be delayed to achieve the desired relative shift so that it goes to its new location in the output frame. Absolute shift of a time-slot is equal to its relative shift plus the phase delay introduced between the input and output frames in order to achieve the desired interchanges within the frame, while maintaining frame integrity. Absolute shift is always a positive integer since a time-slot can be delayed using an optical delay-line but cannot be advanced in time. Hence absolute shift signifies the number of durations by which a time-slot is to be actually delayed. While absolute shift is a positive integer, relative shift could be either a positive or negative integer.

Shift-set of an input frame undergoing time-slot interchange is defined as the ordered set whose elements are the shifts of the individual time-slots ordered in the sequence in which the time-slots appear in the input frame. Relative shift-set and absolute shift-set are defined in exactly the same way.

The following example illustrates the various terms defined above. Suppose the input frame is:

a, b, c, d and the desired output frame after time-slot interchange is:

a, c, b, d

The relative shift for time-slots b and c are 1 and $-1$ respectively. The relative shift-set required for the input frame is:

$\{0, 1, -1, 0\}$

Since c is advanced relative to the frame by one unit by delaying the frame itself by one unit, the absolute shifts for a, b, c, d are:

$0+1, 1+1, -1+1, 0+1$ or, $\{1, 2, 0, 1\}$

In a time-division multiplexed system, for a certain length of frame and for every specified time-slot interchange operation within each frame, the output frame delay has a unique minimum value. Output frame delay represents the collective movement of time-slots of a frame. Since the analysis of time-slot interchange primarily involves the study of time-slot movement, frame delay is an important basic factor in understanding and designing an interchanger system. In a time-division multiplexed signal of frame size N, for any time-slot interchange operation preserving frame integrity, the sum of the relative shifts of the constituent time-slots is zero. Since frame integrity is maintained, the input and output frames are of equal length and both have the same time-slot content. Hence the sum of the distances of the individual time-slots from the leading edge in the input and output frames is the same. To preserve frame integrity, any interchange operation would necessarily involve both time-slots which need to move away from the leading edge and those trying to move closer to the leading edge, thereby forcing an output frame delay.

Perfect shuffle is a typical case among the total N! permutation possibilities. Its study would help in understanding the various issues involved in universal time-slot interchange. Efficient spatially parallel interconnection networks, with the full permutation power of a crossbar switch, can be built using successive perfect shuffle permutations, separated by selective pairwise interchangers. The perfect shuffle is emphasized herein as a specific permutation for comparison purposes regarding a minimal photonic architecture. The perfect shuffle means the division of the sequence and the interleaving in sequence of the segments from each division group.

The perfect shuffle operation on an even-sized deck of $N=2P$ cards separates the bottom P cards from the top P cards and perfectly interleaves them, with the bottom card remaining at the bottom. The shuffle function has application in shuffle-exchange networks, where N is usually a power of 2. Applying the shuffle function to a processing element index is equivalent to taking the left-cyclic end-around shift of its binary representation. Though not often used in computer architecture, perfect shuffle is a valid operation also when N is an odd number. The perfect shuffle on an odd-sized deck of $N=2P+1$ objects separates the bottom $P+1$ cards from the top P cards and interleaves the two sets, with bottom card remaining at the bottom and the $(P+1)$st card emerging at the top.

While trying to do perfect shuffle on the time-slots of an even-sized frame, the first and the last time-slots do not undergo any shift but the pair of time-slots in the center undergo the maximum shift. The time-slots in the earlier half-frame are delayed in an increasing order from 0 to $(P-1)$ in unit step, while the time-slots in the later half-frame are advanced in a decreasing order from $(P-1)$ to 0, again in unit step. To achieve this reordering of time-slots, it is necessary to delay the output frame relative to the input frame by at least $(P-1)$, since the maximum relative advance in the frame is $(P-1)$.

The key to performing perfect shuffle on a sequence of time-slots is to provide delay and switching facility, so that consecutive time-slots are shifted in an increasing order in steps of unity while taking care of absolute shift boundaries and frame boundaries.

A basic assumption prior to an analysis of the time-slot interchanger system features is that the transmission path through switches, connecting links, taps, splitters and combiners is so short that it introduces negligible delay on the photonic signal. The only element capable of producing delay in the transmission path of a signal is a fiber delay line or a loop delay, whose length alone determines the amount of delay with all other influencing factors assumed to remain constant systemwide and at all times. This is not a restrictive assumption that influences the overall value of the results of the analysis, but is a simplification that aids in understanding the central principles involved, and it is always possible to make such corrections as necessary for a practical realization of the systems considered.

The original signal is assumed to travel along the input fiber feeding the system, and the system in turn feeds the output fiber with the internally permuted frames. Two possibilities may then arise. The system may reside somewhere along a transmission line, shuffling the frames arriving from one end and feeding them onto the other side. Or, the system input may connect to one memory loop while its output connects to another one, thereby the second loop could receive the shuffled version of a frame of data in the first loop. In either case, the typical application may differ—for example, the first one in optical communications and the second in optical computing. But both are functionally equivalent.

The time-slot interchange requirement may be the same for a sequence of frames or may differ from frame to frame. In the temporal interconnection network of an optical computer, the interchange function could differ for each of the data frames entering the network. This is a major deviation from a communication system, where all successive frames carrying time-slots from the same channel would generally undergo the same time-slot interchange. The relative shift-set variation between frames means that the output delay for each frame would differ. To retrieve the processed frames in order and without interframe mix-up, it is necessary to let all the frames undergo a uniform delay, typically at the duration of one frame. This requires an evaluation of the minimum delay G of each frame resulting from time-slot interchange and providing an additional delay of N - G.

The basic elements of a time-slot interchanger are photonic switches, which here are the 2×2 directional couplers, delay lines or loop delays, fiber taps, splitters and combiners, links, input and output points and sinks. These and other components, like multiplexers, are analyzed from the point of view of their possible role in the design of a system with desired features.

Figure 2:
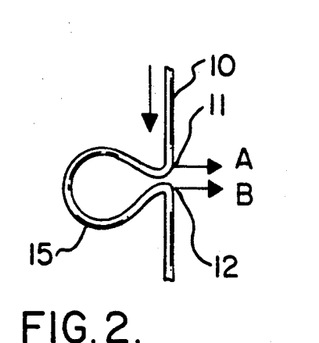
FIG. 2 shows dual input fiber transmission taps including a finite spacing between taps.

As shown in FIG. 2, the system may receive the signal from two or more taps 11 and 12 from the input fiber 10, in which case there should be differences in the signal phase at any instant of time. Or else, they are all equivalent and hence, all but one can be eliminated. The only way the taps could deliver different time-slots simultaneously is to locate the taps at integral number of time-slot durations apart along the fiber. On the other hand, the taps must be closest to the system input point and hence to each other, so that the signal travels negligible distance from a tap to the system. Both these requirements are satisfied only when the input transmission line 10 between every pair of input taps is in the form of bypass loops of lengths equal to integral number of time-slots, as shown in FIG. 2. This also leads to the equivalent circuit of multiple input taps. Any number of input taps can be reduced to a single tap on the input fiber, which then can split with equivalent loop delays introduced in each stream. In FIG. 2, stream 12 gets a constant shift with respect to the stream at tap 11.

Figure 3:
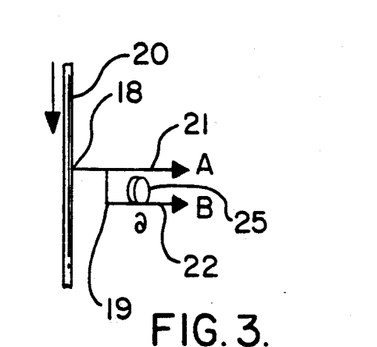
FIG. 3 is a photonic signal handler including a single tap, a splitter and a secondary branch delay.

The term stream is defined as the line joining two points in a system such that the content and order of time-slots entering one point are the same as those leaving the other. Note that FIG. 3 is functionally equivalent to FIG. 2. In FIG. 3, a single tap 18 is coupled to input fiber 20, with splitter 19 and delay loop 25 causing outputs 21 and 22 to correlate with FIG. 2 outputs 11 and 12, respectively.

A fiber splitter is functionally identical to the input tap considered earlier. A splitter in a stream produces a duplicate stream with identical time-slots flowing through both of them. Thus, m splitters in a stream generate m additional streams of time-slots. However, the power level in each stream drops typically by 3 dB in an even split, and hence, due to physical design considerations like signal-to-noise ratio, there are practical limits on the number of taps, splitters, etc. used in the system. A fiber combiner produces a single stream out of two streams, combining the signals therein without the use of any switch. In a time-division multiplexed system, a combiner will have little flexibility, and only one stream may deliver data to the combiner during any particular time-slot duration. A combiner receiving two time-slots simultaneously would destroy their data content. Hence, a combiner and a splitter are not used in a complimentary way. Though a demultiplexer and a combiner could operationally cooperate, potential data corruption and lack of design flexibility may preclude the use of combiners in a time-slot interchanging system.

There are three measures of merit associated with system designs using photonic 2×2 directional couplers. First, the number of switches is roughly a measure of the total cost of the system. Second, the number of switches a time-slot must transverse is a reasonable measure of the optic path loss. Third, the number of switch encounters, where two signals share a common switch simultaneously, is a rough measure of the crosstalk.

Figure 4:
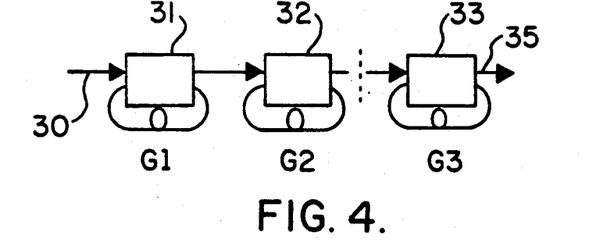
FIG. 4 is a multiple stage delay element with feedback selectable for each stage.

FIG. 4 is a general block configuration of a serial array time slot interchanger (TSI) with feedback loop delay and made up of multiple stages. Such a time-slot interchanger uses multiple feedback loops such as G1, G2 and G3 for respective switch elements 31, 32 and 33. The length of the array (I.E.: the number of stages) depends on the value of N.

Figure 5:
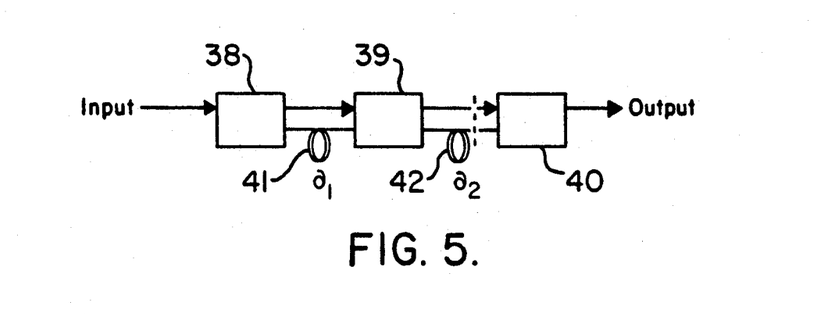
FIG. 5 is a multiple stage delay element with the delay in a selectable output for each stage.

FIG. 5 illustrates a TSI with feed-forward delays. The delay elements are made up of multiple switches such as 38-40 and loops such as 41 and 42 of different sizes arranged in a feed-forward structure. The number of switches is more than in the case of the TSI with feedback loop delay shown in FIG. 4. However, the switch traversals are lower and the switch crossovers are eliminated.

The preferred embodiments of this invention are described below in the examples shown as perfect shuffler systems using serial array architectures. They are especially designed to take advantage of the regularity of shift operations involved in doing a perfect shuffle on a time-multiplexed signal. The design focuses on minimizing the number of switches involved, with as few switch traversals of the signal as possible. Ability to produce close to the theoretical mini!num frame delay is also emphasized. A feature is that the input signal is made to traverse an array of elements of a similar structure, arranged serially. These structures are called basic blocks and are defined below.

A basic block is defined as a single fiber delay component minimally supported by other elements like switches, taps, etc. and capable of performing useful time-slot interchange operation. As the time-slots flow through each block, they are switched to either select or skip the fiber delay, and as they emerge from the last stage and fall into place in the output frame, they would have undergone just the required amount of delay. The basic blocks, depending on their structure, may input/output either one stream or two streams of signals and may have facility to let the slots circulate within the fiber more than once. Every stage in the array has its share of contribution to the overall absolute shift required for the individual time-slots.

A time-slot loop assignment table (note FIGS. 8A and 10, for example) is a convenient way of specifying the number of fiber delays in a system, their values and whether or not each of the time-slots will select or bypass each one of them. The table however does not specify the order in which the different basic blocks are arranged in the system. If the basic blocks provide for recirculation within the loops, the table indicates the number of circulations for each slot within the loops.

The table also lists the absolute shifts required for each of the time-slots.

A Time-slot flow table is another convenient representation scheme which depicts the control sequence for individual switches in the system. There are as many flow tables as there are switches in the system. The flow of time-slots through each of the switch terminals and the switch setting signals at the control terminal are shown in the different rows of the table. Each column of the table corresponds to a slot duration. If duplicate copies of the time slots flow through the switches, the table highlights those slots which would ultimately appear in the output frame.

The symbol K(G) is used to represent a basic block, the value of whose delay element is G. The term shift-number is introduced to partly measure the ability of a basic block to perform time-slot interchange. The term can also apply to a system or an input frame and is defined below:

The shift-number A of a basic block K(G) is the number of unique values of shift that it can impart to an isolated time-slot flowing through it. The shift-number of a time-slot interchanging system is the number of unique values of shift it can impart to an isolated time-slot flowing through it. The shift-number of a frame in a time-division multiplexed signal is the number of unique values of absolute shifts the time-slots in the frame will undergo in order to achieve the desired time-slot interchange. For example, the shift-numbers of frames of sizes 8 and 9 for perfect shuffle interchange are 7 and 9, respectively.

The term isolated time-slot is used in the definitions of shift-numbers for basic blocks and systems to eliminate the effects of relative timing constraints involved when time-slots and frames flow in sequence in the system. Relative timing factors are equally important issues in designing time-slot interchanger systems.

The overall shift required for a time-slot is achieved in one step through a single fiber delay or in parts by passing it through several delays, since pure delay obeys the simple addition operation. This suggests building a system by placing basic blocks of shift-number such that the overall system can impart a range of shift values to a time-slot by selecting the desired stage delays as the time slot flows through each of them. Further, since simple addition is a commutative operation, the order in which the basic blocks appear in the array is immaterial for isolated time-slot shift. However, relative timing constraints may dictate the order of basic blocks within an array.

The simplest way of building a basic block from a fiber delay is to connect it to one of the input or output terminals of a 2×2 switch, as is shown in FIG. 5. When basic blocks with different fiber delays are arranged linearly as an array, they form a system with a pair of streams connecting the neighboring stages. This architecture is called the linear switch array with feed-forward delay. If the fiber delay is connected to one of the output terminals of the switch in each basic block, then the final stage in the system does not actively contribute to time-slot interchange of the input signal. This is so because, the delay on the output side of the final stage either serves as the system output or terminates in a sink. Hence, the final stage delay either shifts the output frame by a constant value, if it is connected to the system output terminal, or is not in the path of the output frame at all, if it is terminated at the sink. In order to avoid such redundancy, it is preferable to connect the fiber delay to one of the input switch terminals in each basic block.

A necessary but not sufficient condition for a system to perfect shuffle a frame of size N is that the system shift-number is equal to, or greater than, the frame shift-=number. The shift-number of a frame for perfect shuffle operation is $N-1$, if N is an even number. Based on the necessary condition of shift-number, the number of stages required for $N=9$ is 3. As mentioned earlier, the other requirement is that relative timing among slots is satisfied. When two time-slots arriving in the two streams at the same time at the input terminals of a stage are both required to pass through the stage delay or to bypass it, contention occurs in the stage. Such a contention will have to be avoided in designing the system. For this class of architecture there are three factors which influence the relative timing among slots in the system:

(i) The relative phase difference between the two input streams to the system.
(ii) The individual stage delays.
(iii) The order of arrangement of the basic blocks in the array.

Hence, by careful choice of taps, delays and order of the basic blocks within the array, it is possible to avoid contention.

Figure 6:
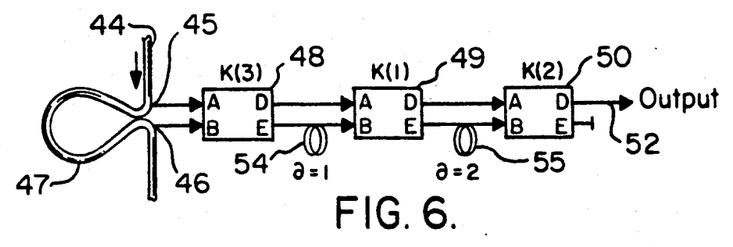
FIG. 6 is a serial array with feed-forward delay suitable for a format of N=8.
Figure 7:
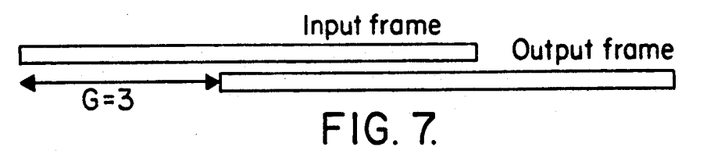
FIG. 7 is a time base diagram for FIG. 6 showing the absolute output delay relative to the input.
Figure 8A:
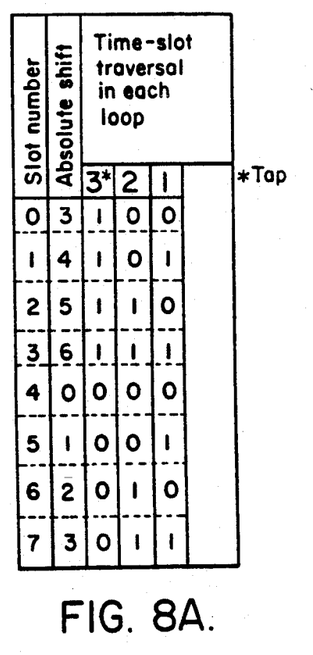
FIG. 8A to 8E are tables illustrating an operation of the FIG. 6 circuit.
Figure 8B:
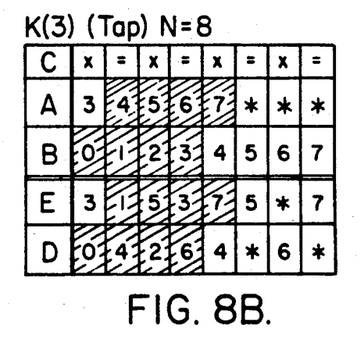
Figure 8C:
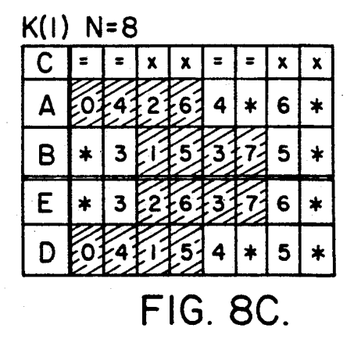
Figure 8D:
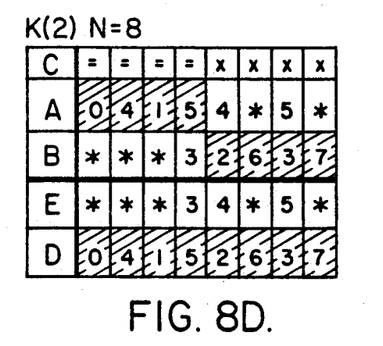
Figure 8E:
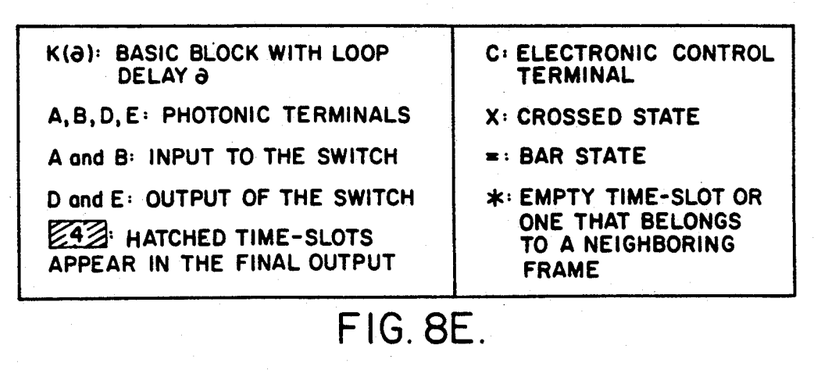

FIGS. 6, 7 and 8A respectively show the architecture, frame delay, and loop assignment table for a linear array with feed-forward delay for performing a perfect shuffle on a frame of size $N=8$. The input from fiber 44 is directly coupled to taps 45 while a second tap 46 has an equivalent delay of 3 because of delay loop 47. Taps 45 and 46 along with the first switch forms the first stage K(3), while K(1) and K(2) form the second stage 49 and final stages 50 of the array. In FIGS. 8B, 8C and 8D are presented the three time-slot flow tables, one for each of the switches in the system. FIG. 8E is a table describing the various symbols and elements employed in FIGS. 8A–8D. The groups of time-slots which will appear in the output frame 52 are distinguished in the tables from those which will sink at the end. Note that loop 54 has a delay length of 1 while loop 55 delay length is 2.

To measure the output frame 52 delay, tap 45 of FIG. 6 is taken as the reference, and the frame delay is the duration from the moment the first incoming time-slot, 0, enters tap 45 to the moment when the first outgoing time-slot, 0, leaves the output 52 of the final stage (50). This is so because tap 45 is the primary input to the system and the tap 46 stream is only a delayed version of the primary stream. The frame delay is computed by adding the delays traversed in every stage by the copy of the first output time-slot, 0. Hence, distinguishing the different copies of time-slots in the flow table is important. If tap 46 is taken as the reference, it would deceptively appear as though there is no frame delay at all.

When N is an integral power of 2, the number of switches required for a perfect shuffle is $\log_2 N$. and the output fame delay is the theoretical minimum achievable. The number of switch traversals for every time-slot is the same and equal to $\log_2 n$. Another interesting and useful property for practical implementation is that the control signals follow a simple square wave pattern with 50% duty cycle for each of the switches in the system, while the frequency of the square control waveform halves from stage to stage.

When N is an odd number, the frame shift-number if N, and the required number of switches is $\lceil \log_2 N \rceil$, while the number of switch traversals and the number of switch crossings are the same. For instance, when N=9 the number of switches=4, and the number of switch traversals is also 4. However, the frame delay is 7 as against the theoretical minimum delay of 4.

Figure 9:
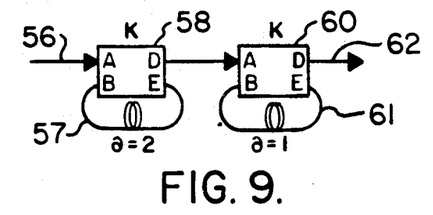
FIG. 9 is base 2 serial array with feedback delay for handling N=8.

A fiber delay connected across a switch between its input and output terminals forms a basic block. When such blocks are cascaded together, the resulting array forms a system called the serial switch array architecture with feedback loop delay as shown in FIG. 9. The basic block has a single stream input and a single stream output, and the entire array can also be viewed as having a single input stream and a single shuffled output stream. There are no splitters, and hence no multiple copies of time-slots in the system. Because of the feedback, the basic block can impart infinite values of shift to an isolated time-slot entering it by allowing multiple recirculation within the loop. For instance, the block K(g) can generate the shift-set $\{0, G, 2G, 3G \ldots 2G, 3G \ldots\}$. Hence, the shift-numbers for the block and the system are both infinity. It is therefore not useful to analyze the system in terms of shift-number. Relative timing issues that arise as a sequence of time-slots flow through the system are a significant consideration in the analysis of this class of architectures.

If the values of loop delay associated with each stage are the integers $2^k$, where $k=0, 1, 2, \ldots$, the shift-base of this array is 2. The order of arrangement of the blocks within the array is determined by relative timing. As in the earlier case, a conflict could arise in a stage when two time-slots are attempting entry into a loop delay at the same time, or when they may both need to exit the stage at the same time. At any switching moment of time, the two time-slots involved in contention are the one reentering the switch from the loop and the one entering the stage for the first time. When the loop size is G, it can carry as many as G time-slots simultaneously and contention may only arise between those entering the input terminals of the switch.

Figure 10:
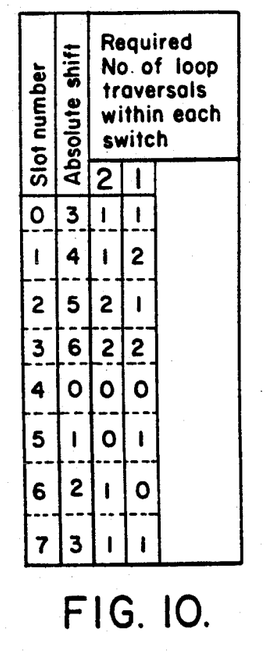
FIG. 10 is a table of the FIG. 9 operation.
Figure 11A:
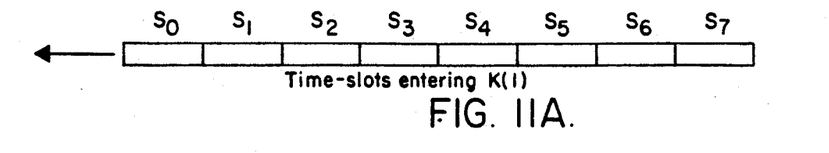
FIG. 11A through 11G represent an illustration of a single switch operation using feedback to bring out the advantage of base 3 operation to reduce the number of switches in the system.
Figure 11B:
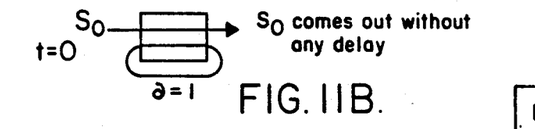
Figure 11C:
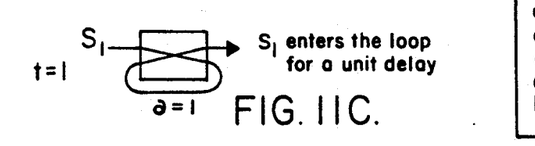
Figure 11D:
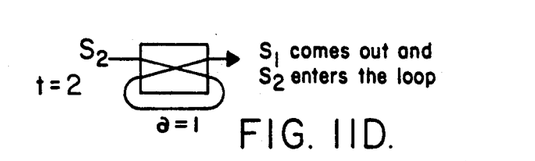
Figure 11E:
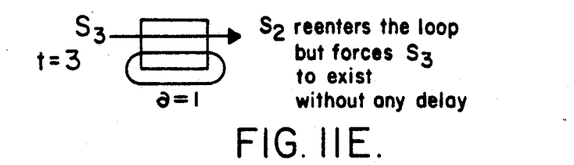
Figure 11F:
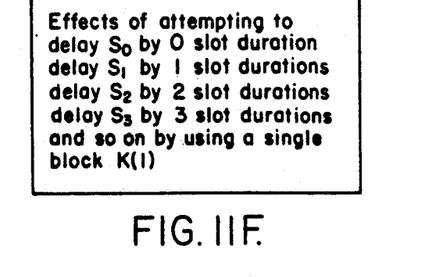
Figure 11G:
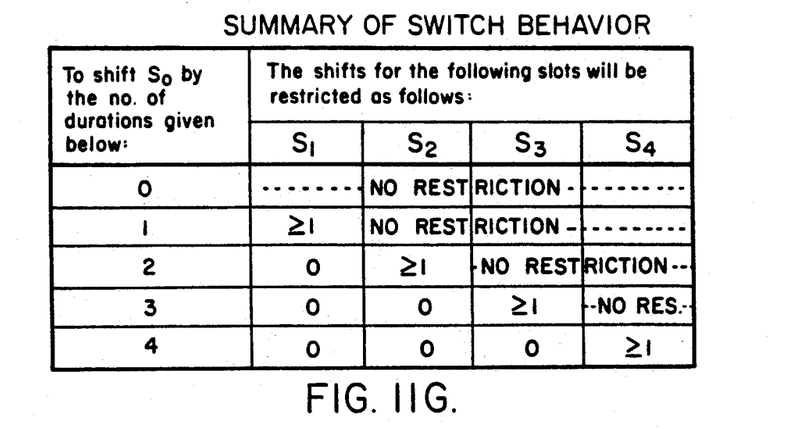

The architecture for N=8 is given in FIG. 9 along with the time-slot loop assignment table in FIG. 10. Two switches 58 [K(2)] and 60 [K(1)] are required to perfect shuffle a frame of size 8. Loop 57 has a delay length of 2 whereas loop 61 has a delay length of 1. It is seen that the absolute shift for time-slot 3 is the maximum and that it circulates twice in each of the stages. In all cases such as N=8, 16 or 64, the system produces the theoretical minimum frame delay. The number of switches required for N=9 is 3, but the frame delay is longer than the theoretical minimum delay.

The number of switches required for perfect shuffling a frame of size N is $[\log_2 N] - 1$. This means a saving of one switch over the previous architecture for perfect shuffling the same size frames. The number of switch traversals and the number of switch crossings in the worst case are $3\{[\log_2 N] - 1\}$ each, meaning that a time-slot can circulate twice through every loop in the system, thereby traversing a switch thrice. The system does not permit recirculation more than once in any delay due to relative timing considerations, and this is an additional favorable feature from the point of view of signal deterioration.

The flow table gives the number of circulations through each loop for each of the incoming time-slots. The table also shows the control of the switches during each slot duration.

A serial array with feedback loop delay using a shift-base of 3 can reduce the number of switches even further to the theoretically lowest possible number. Given the shift numbers of the feed-forward delay architectures developed earlier, these architectures have the fewest possible switches to perfect shuffle frames of various sizes.

The basic block in the feedback delay architecture has an infinite shift-number and this fact is put to maximum advantage in reducing the number of switches even further. The variable factors from the point of view of switch minimization are:

(i) The shift-base for the array,
(ii) The control sequences for the switches,
(iii) The order of basic blocks within the array.

Of these, the control for the switches is dependent on the shift-base chosen and has to follow the time-slot loop assignment in order to achieve perfect shuffle interchange. The order of the basic blocks within the array is chosen to achieve proper relative slot timing. Shift-base is the only independent variable which requires tuning to achieve switch minimization.

In the ideal case, if there were no conflicts due to other time-slots, a single basic block with unit feedback loop delay would suffice to achieve the desired shift for each time-slot through recirculation. However, a switch with a unitary delay (i.e.: K(1)) cannot meet the shift requirements of all consecutive time-slots flowing through it as illustrated in FIG. 11. Perfect shuffle operation requires that, within the boundaries of the shift-cycle, consecutive time-slots be delayed in an increasing order in steps of one. This requirement poses a challenge to a basic block. The behavior of K(1) in the presence of a sequence of time-slots arriving at its input, with shift requirements described earlier, is portrayed in FIGS. 11B through 11E as supplemented by the information contained in the FIG. 11 chart and the FIG. 11G table summarizing the behavior of the switch. It is seen that the basic block K(1) successfully shifts succeeding slots by 0, 1, and 2. It is unable to shift the next slot by 3, and instead forces it to bypass the delay. However, K(1) can shift succeeding time-slots by the sequence of values:

$$0, 1, 2, 0, 1, 2, 0, 1, 2, \ldots$$

It is further seen that if any time-slot is allowed to circulate thrice or more, then 2 or more of the following time-slots will have to skip the stage without any shift, thus reducing the efficiency of the basic block.

Similarly, K(g) can be verified to perform the following shift-cycle on a sequence of incoming time-slots:

$$0, \ldots, 0, G, \ldots, G, 2G, \ldots, 2G, 0, \ldots, 0, G, \ldots, G, \ldots$$

each sub-group of G time-slots being delayed by the same value. The shift-radix of the basic block is 3. The shift-radix of a basic block is defined as the maximum number of consecutive time-slots that it can shift by delays increasing in steps of one, when the loop delay of the block is chosen as unity. For example, the shift-radix of the basic block in the serial array architecture with feed-forward delay is 2.

In a serial feedback loop delay architecture, each stage corresponds to a digit and the shift-radix corresponds to the radix of the number system. To shift the time slots by consecutive increasing integer values, the system should have as high a shift-radix as possible to minimize the number of stages. Just as the digit positions are weighted by integral powers of the radix, the basic blocks in the array should have delays in integral powers of the shift-radix.

Since the maximum value of the shift-radix is limited to 3, it follows that to perform perfect shuffle by a serial array architecture with the minimum number of switches, a ternary shift-base is preferred.

Using a shift-base of 3 for the serial array architecture with feedback delay, the number of switches required for a frame of size N is $[\log_3 N]$. The number of switch traversals and the number of switch crossings in the worst case are both $3\{[\log_3 N]\}$, since a maximum of two circulations are possible in each loop. It yields a saving of one switch over the similar architecture using shift-base of 2. Since the ternary system is ideally tuned to frame sizes which are powers of 3, this design can handle the most time-slots with the fewest switches and produce theoretical output frame delays when $N=3^k$. For instance, when $N=9$, only two stages are required as shown in FIG. 9 which illustrates a serial switch array architecture with feedback loop delay using shift-base of 3 if the delay for loop 57 is changed from 2 to 3. A shift-base of 3 will give even better savings over the other serial array architectures as N increases beyond 64.

Use of shift-base 3 in a time slot interchanger system for performing specific, limited or universal permutation is another important feature of this invention.

Serial Array Time-Slot Interchangers in accordance with the present invention are capable of specific, limited or universal permutation and can perform universal permutation using a number of $2 \times 2$ switches. No time-slot flows through the same switch more than thrice. It is possible to implement the invention electronically, electro-optically, or optically.

Figure 12:
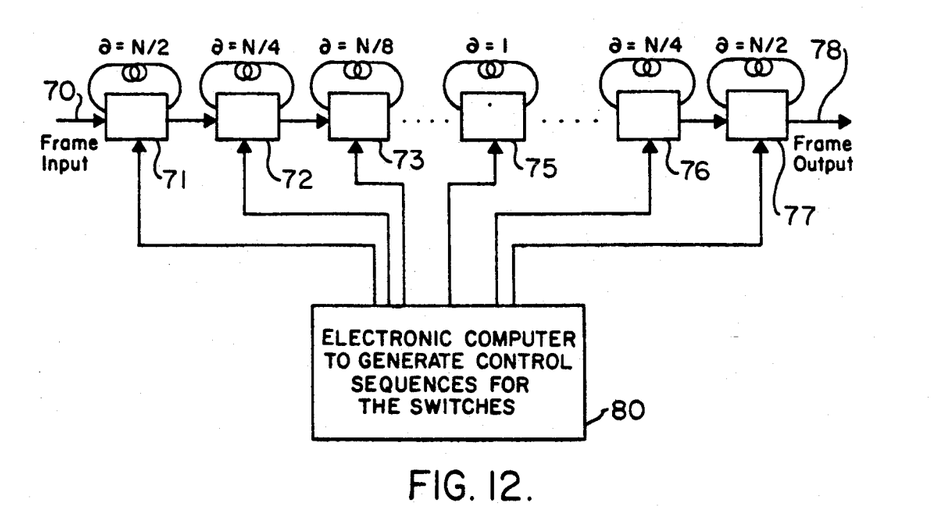
FIG. 12 is a block diagram of a serial array universal time slot interchanger using 2 log$_2$N-1 switches.
Figure 13:
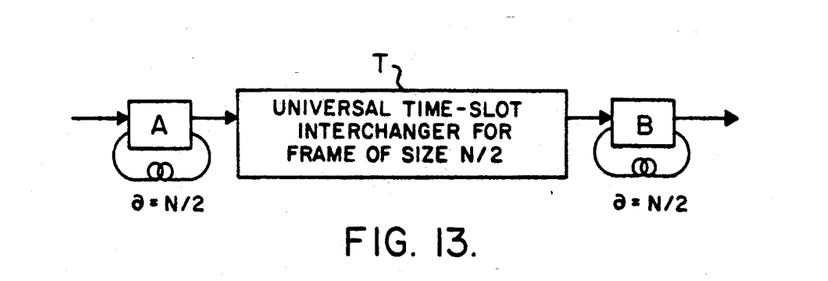
FIG. 13 is a serial time slot interchanger for a frame of size N viewed as a recursive construction from smaller arrays.

The serial array time-slot interchanger for universal permutation pursuant to this invention uses (2 $\log_2 N - 1$) basic blocks with feedback loop delays as shown in block diagram form in FIG. 12 which can universally permute the time-slots within a frame of size N. FIG. 13 is a serial time-slot interchanger for a frame of size N viewed as a recursive construction from small arrays.

FIG. 12 is a somewhat generalized circuit diagram of a preferred embodiment for this invention adapted as a universal time-slot interchanger. The frame of N time slots is introduced at input 70 and sequentially passes through switch elements 71-77. The output 78 is a frame of the same time length as input 70 but delayed on a real time basis. Further, the time slot segments of output 78 are rearranged as directed by the control signals produced by computer or controller 80. Some of switch elements 71-77 may simply pass the input thereto directly to its output for some frame size interchanges.

Note that a given time-slot to the input of a switch might enter the feedback loop thereof while the next time-slot passes directly through the switch to its output. For instance, assume $N=8$. In response to a sequence of control signal commands from computer 80, a first time-slot enters the feedback loop switch 71 followed by a second time-slot that is switched through element 71 directly to the input switch 72. As a result of a unit circulation of the first time-slot within the loop, switch 72 sees a data time slot sequence wherein the first time-slot data appears in the N/2-1 time slot position following the second time-slot appearance at the input for switch 72. Note also that a lesser number of switch elements in a FIG. 12 configuration still accommodates a large variety of time-slot rearrangements.

Assume that in the serial array structure shown in FIG. 13, the first basic block, A, with feedback loop of delay N/2 is followed by a serial universal time-slot interchanger, T, for a frame of size N/2, which is half the original frame size. T can universally permute the leading half sequence of N/2 time-slots first and then can universally permute the trailing half sequence of N/2 time-slots. Even though a single array for size N/2 is sufficient for universal permutation of both the half frames arriving in sequence, for the convenience of discussion below, let T be designated as T1 when T is permuting the leading half frame, and Tt when it is permuting the trailing half frame. The last stage of the overall array is again a block, B, with feedback loop of deal N/2.

Figure 14A:
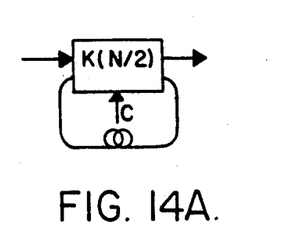
FIG. 14A through 14C provide an illustration of a switch element exchanging time-slot pairs.
Figure 14B:
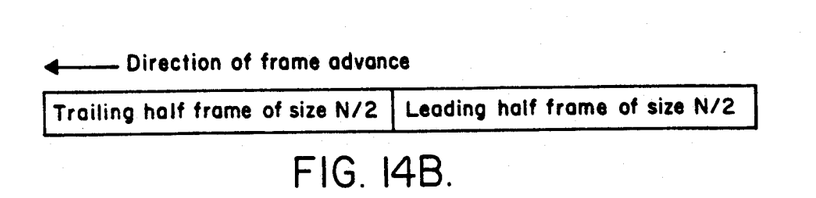
Figure 14C:
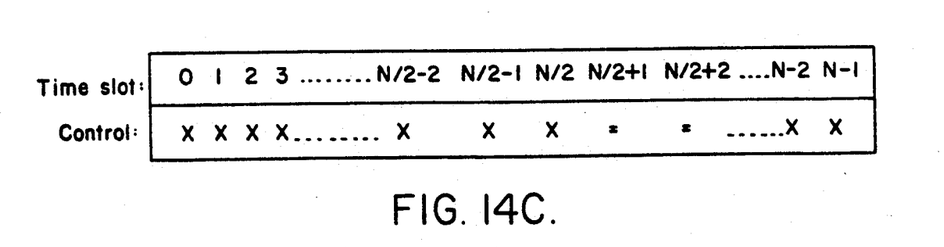

In FIG. 14, the basic block with feedback loop of delay N/2 can either exchange or not exchange every pair of time-slots spaced N/2 apart, depending on the control sequence C applied to the switch in the block. In other words the circuit of FIG. 14A is capable of exchanging any time-slot in the leading half frame with its mate in the trailing half frame spaced N/2 apart (note FIG. 14B). In FIG. 14, time-slot pairs $\{1; N/2+1\}$, $\{2; N/2+2\}$, ..., are exchanged, while other pairs remain undisturbed. The control sequence shown in FIG. 14C is repeated for every frame. Let $\{Sk, \underline{Sk}\}$ denote any pair of slots separated N/2 apart.

Let So be the first input time-slot and after an arbitrary permutation, let S'o be its corresponding output time-slot. Let So be passed by A without exchange so that it remains in the leading half frame as it enters T1. Since T1 is capable of universal permutation within the leading half frame, let it permute So to S'o, if S'o should belong to the leading half of the output frame, or else, to its mate $\underline{S'o}$, which belongs to the leading half of the output frame. If the output of T1 goes to S'o, then B can pass it without exchange. If the output of T1 goes to $\underline{S'o}$, then it is exchanged with S'o. This completes the permutation of input time-slot So.

Tracing in time the movement of the output slot S'o, it is easily seen that the routing for S'o is from Tt, through the basic block B. If Soi is the input slot to be permuted to the output slot S'o, then Tt can establish a route to S'o from Soi, or $\underline{Soi}$, whichever belongs to the trailing half of the input frame. Basic block A can exchange the pair $[Soi, \underline{Soi}]$, if $\underline{Soi}$ is not in the trailing half of the frame, or simply pass it if otherwise. If $\underline{Soi} = So$, then basic block A will already be set at this time, but $\underline{Soi}$ cannot be the same as So in a permutation so it is set correctly. Thus, the routing for the second input/output pair $[\underline{Soi}, S'o]$ is also established. By following the input slot $\underline{Soi}$ and proceeding through T1, the time-domain routing to the corresponding output slot is established. This process of establishing routing is continued, alternating use of T1 and Tt, until all input/output time-slot routing is established. If not all input-output routing is completed, the user can start with any new input slot and passing through T1, and continuing the process, go through the cycle as many times as necessary until all input/output slot routing is established and basic blocks A and B are set for every possible time-slot pairs in the input and output frames.

The entire procedure is now repeated for the half frame time-slot interchanger, T, etc., and in a recursive way until the entire serial array is set up. The procedure can never be interrupted due to lack of routing facility, since basic blocks A and B provide a choice of two routes for every input and output time-slot through T1 and Tt.

It can be easily verified that the array will finally consist of the following basic blocks with feedback delay:

K(N/2), K(N/4), K(N/8), . . . , K(2), K(1), K(2), . . . , K(N/8), K(N/4), K(N/2).

Hence, the total number of switches in the system for the serial array time-slot interchanger will be $(2\log_2 N - 1)$.

The invention might easily have a major impact on the telecommunications industry. The ability to do time-slot interchange on 1000 transmissions using only about 20 expensive switches instead of 2000 or more, as required by a distributed parallel time-slot interchanger promises considerable economy of manufacture for such systems. The invention does not require new infrastructure, is applicable in a relatively direct manner in existing systems.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. Apparatus for interchanging data containing time slots wherein N of said time slots occur during a predetermined frame of time comprising
a plurality of switching elements each having an input means and an output means and each responding to a first control signal introduced thereto for coupling said input means directly to said output means and responding to at least one second control signal introduced thereto for producing signals from said input means at said output means after a predetermined time delay,
means coupling said switching elements input and output means in a serial array with the first said switching element of said serial array having said frame containing N time slots coupled to the input thereof, and
means producing a sequence of said control signals for causing said serial array to produce a frame of N time slots at the Output of the last said switching element of said serial array with said time slots occupying time sequence relationships therebetween different from the time sequence introduced to said input means of said first switch element.

2. Apparatus in accordance with claim 1 wherein said switching elements each includes means for feeding back output signals thereof to the said input means thereof after said predetermined time delay.

3. Apparatus in accordance with claim 2 wherein said feed back means produces said feed back signal after a time delay of a duration which is a multiple of the time duration of a time slot.

4. Apparatus in accordance with claim 3 wherein said switching elements are each photonic switches, and said feed back means is an optical delay line coupled from said output means to said input means and arranged for delaying the feed back signal by a multiple of the time duration of one time slot.

5. Apparatus in accordance with claim 1 wherein said switching elements are each a 2×2 photonic switch.

6. Apparatus in accordance with claim 5 wherein said delay means includes an optical delay line coupled to said output means of said switch for establishing said predetermined time delay output.

7. Apparatus for interchanging data which is contained in a multiplicity of serially occurring time slots with N such time slots contained in a predetermined frame of time comprising
a switching stage including a switch element and a time delay means,
said switch element having first and second input terminals and first and second output terminals, said switch element normally coupling said input terminals to a respective said output terminal, said switch element further including means responsive to control signals introduced thereto for causing said switch element to reverse the said input terminal to said output terminal connections,
said time delay means coupled between said second output terminal and said second input terminal for reproducing signals from said second output terminal at said second input terminal after a predetermined time delay,
means interconnecting a plurality of said switching stages in a serial array having at least an initial said stage and a terminal said stage with said initial stage first input terminal coupled as an array input for receiving the original frame of N data time slots, said first output terminal of said array terminal stage providing the output for said array, said array terminal stage having its said first input terminal coupled to said first output terminal of the preceding said switching stage, and
control signal generating means connected for selectively providing control signals to respective said switch elements for delaying at least one of the time slots so that it occurs in a different sequential position in the frame of N time slots produced at said first output terminal of said terminal serial array switch element.

8. Apparatus in accordance with claim 7 wherein said time delay means is a delay line, said serial array including at least one intermediary said switching stage having its said first input terminal coupled to said first output terminal of said initial switching stage and its said first output terminal coupled to said first input terminal of said serial array terminal stage.

9. Apparatus in accordance with claim 8 where said switch elements are each photonic directional couplers, and said delay lines are each optical delay loops.

10. Apparatus in accordance with claim 7 wherein said serial array includes a plurality of intermediary said switching stages having their first input and output terminals coupled seriatim and with the first of said intermediary switching stages having its said input terminal coupled to said initial stage first output terminal and the said output terminal of the last of said intermediary switching stages connected to said first input terminal of said serial array terminal stage.

11. Apparatus in accordance with claim 10 wherein said delay line responds to an input thereto to produce an output therefrom after a time delay which is a whole number multiple of the time span of one time slot.

12. Apparatus in accordance with claim 11 wherein said switch elements are each a photonic directional coupler.

13. Apparatus for interchanging data which is contained in a multiplicity of serially occurring time slots with N such time slots contained in a predetermined frame of time comprising a switch element having first and second input terminals and first and second output terminals, said switch element normally coupling said input terminals to a respective said output terminal, said switch element further including means responsive to control signals introduced thereto for causing said switch to reverse the said input terminal to said output terminal connections, means responsive to signals at the input thereof for reproducing said signals at an output after a time delay, means interconnecting a plurality of switch elements in a serial array with one of said input terminals of the initial said switch element coupled as an array input for receiving the original frame of N data time slots, said serial array including at least one other said switch elegant connected as an array output stage and having its said first input terminal thereof coupled to said first output terminal of the preceding said array switch element for receiving undelayed signals, a said time delay means coupling said second input terminal of said array output stage switch element to the said second output terminal of the said preceding said serial array switch element, and control signal generating means connected for selectively providing control signals to respective said switch elements for delaying at least one of the time slots so that it occurs in a different sequential position in the frame of N time slots produced at one of said output terminals of the last said switch element of said serial array.

14. Apparatus in accordance with claim 13 wherein serial array includes at least one intermediary said switch element coupled between said initial switch element and said array output stage switch element, said first input terminal of each said intermediary and array output switch elements connected to the said first output terminal of the preceding said switch element, and a separate said time delay means coupling said intermediate switch element second input terminal with said initial switch element second output terminal.

15. Apparatus in accordance with claim 14 wherein said switch elements are each photonic directional couplers, and said time delay means is an optical delay loop which responds to an input thereto to produce an output therefrom after a time delay which is a whole number multiple of the time span of one time slot.

16. Apparatus in accordance with claim 13 wherein serial array includes a plurality of intermediary switching stages each including a said switch element with a said delay means coupled between its said second input terminal and the said second output terminal of the preceding said switch element, said first input and output terminals of all said switch elements being interconnected seriatim from said initial switch element first output terminal to said array output stage first output terminal.

17. Apparatus in accordance with claim 16 wherein said switch elements are each photonic directional couplers, and said time delay means is an optical delay loop which responds to an input thereto to produce an output therefrom after a time delay which is a whole number multiple of the time span of one time slot.

18. A process for interchanging a plurality of data containing time slots with N of said time slots occurring in a first sequence during a predetermined frame of time and utilizing a plurality of serially arranged switch elements each of which responds to a control signal to transfer signals at an input thereto to an output thereof either directly or after a predetermined delay in response to the state of said control signal comprising the steps of receiving the first sequence of N time slots, passing said N time slot signals through said plurality of switch elements seriatim, and introducing control signals to said switch elements for delaying selected ones of said time slots so that said time slots appear at the output of the last of said switch elements in any preselected second sequence different from said first sequence.

19. A process in accordance with claim 18 wherein each switch element is capable of responding to control signals so as to concurrently delay a prior received signal and pass a subsequent received time signal directly to the output thereof, said control signal introducing steps including the step of generating at least one sequence of said control signals for causing a said switch element to produce a time slot at a later occurring position in the frame of N time slots from said serially arranged switch elements, whereby the real time occurrence of the frame of N time slots at the serial array output is delayed by at least one time slot duration relative to the real time occurrence of the frame of N time slots at the input to the serial array of switch elements.

* * * * *